L. H. VOLD.
LATHE.
APPLICATION FILED JUNE 9, 1909.

941,475.

Patented Nov. 30, 1909.

WITNESSES:
Rot R Kitchel.
A. M. Irian

INVENTOR
Lars H. Vold
BY Harding & Harding
ATTORNEYS.

UNITED STATES PATENT OFFICE.

LARS H. VOLD, OF WESTVILLE, NEW JERSEY, ASSIGNOR TO WILLIAM SELLERS & COMPANY, INCORPORATED, OF PHILADELPHIA, PENNSYLVANIA, A CORPORATION OF PENNSYLVANIA.

LATHE.

941,475.  Specification of Letters Patent.  Patented Nov. 30, 1909.

Application filed June 9, 1909. Serial No. 501,095.

*To all whom it may concern:*

Be it known that I, LARS H. VOLD, a citizen of the United States, residing at Westville, county of Gloucester, and State of New Jersey, have invented a new and useful Improvement in Lathes, of which the following is a full, clear, and exact description, reference being had to the accompanying drawings, which form a part of this specification.

My invention has for its object to provide means whereby the work may be held or positioned on a lathe with a predetermined end pressure that will be substantially constant notwithstanding movements of the lathe heads.

More specifically the invention has for its object to provide means whereby the pressure applied shall be only that produced by an elastic medium, preferably a spring or springs.

A further object of the invention is to so arrange said elastic medium that when the lathe head or heads are moved inwardly to force the drivers against the work, said movement shall be transmitted to the lathe centering devices through such elastic medium, thereby limiting the end pressure of the positioning means upon the work and insuring also a maintenance of said pressure in case the heads spring apart slightly under the influence of the cut.

The invention finds perhaps its most useful application in connection with wheel lathes; and in illustrating a preferred embodiment of my invention, I have shown the same applied to a lathe of this type.

Figure 1:
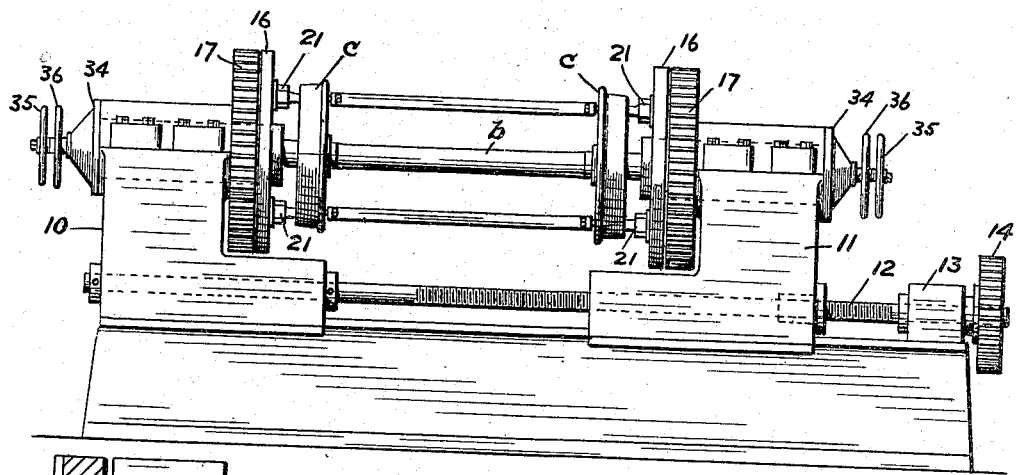
Figure 2:
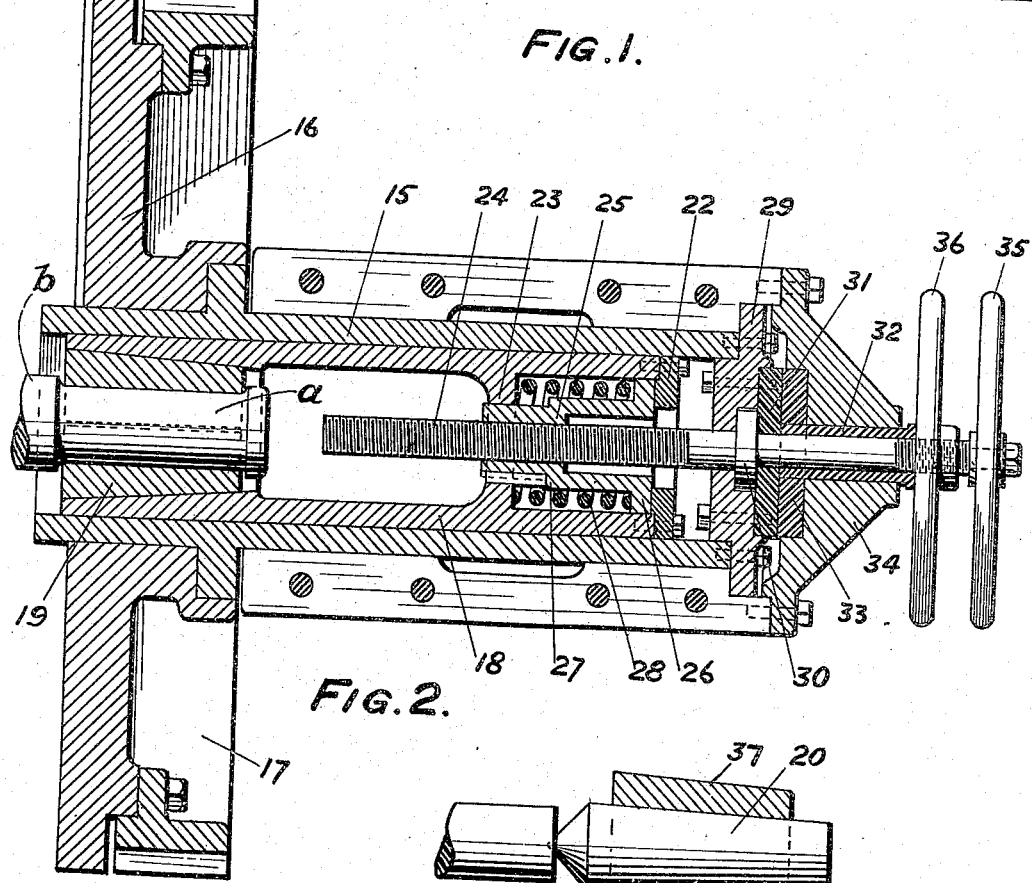
Figure 3:
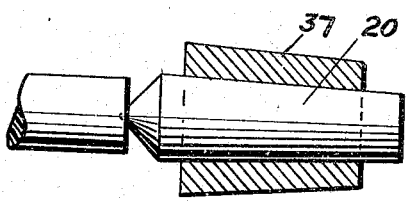

In the drawings: Figure 1 is a side elevation of the main parts of the lathe; Fig. 2 is a longitudinal sectional view through one of the lathe heads; Fig. 3 is a detail view showing a modified form of lathe center to which the invention is applicable.

10, 11, are the lathe heads carrying the centering devices and face plates of a wheel lathe. These heads, either or both, are adjustable along the bed by any convenient means. In the drawings a screw 12, carrying a driving gear 14, extends through a movable head 11, a stationary head 10, and a stand 13 and is in threaded engagement with the head 11, thereby enabling the head 11 to be adjusted toward or from the head 10.

15 is the rotatable sleeve turning in bearings on each lathe head.

16 is the face plate bolted on the sleeve 15.

17 is a driving gear bolted to the face plate. The gear may be driven by any convenient means forming no part of my invention and therefore not described or shown.

18 is a hollow spindle slidable within the sleeve 15. The opening in the front of the spindle is of conical shape and receives a sectional bushing 19, conical on the outside. The bushing 19 embraces the journal $a$ on the end of the axle $b$ carrying the wheels $c$ to be turned. Or a solid bushing 37 may be used, as shown in Fig. 3, to receive a center 20 adapted to engage the end of an axle unprovided with outside journals. Secured to the face plate are drivers 21 adapted to engage the wheel rim. These drivers may be of any suitable construction, such, for example, as shown in the Burt Patent No. 881,373, of March 10, 1908.

22 is an annular inwardly-extending flange bolted to the rear end of the spindle 18, and 23 is an annular inwardly-extending flange integral with the spindle 18 and located some distance in front of the rear end of the spindle.

24 is a screw shaft extending into the spindle 18 and through the same to a point in rear of the bushing 19. On the screw shaft 24, in front of the flange 22, is a nut 25 having a contracted front end sliding in and keyed to the flange 23, a rear flange 26 limiting its rearward movement and a shoulder 27 limiting its forward movement. Confined between the flange 26 of the nut and the flange 23 of the spindle is a coil spring 28.

29 is a plate bolted on the rear end of the sleeve 15 and centrally orificed to permit the screw shaft 24 to extend through it.

30 is a collar on the screw shaft behind the plate 29.

31 is a thrust washer sleeved on the screw shaft 24 back of the collar 30 and bolted to the plate 29.

32 is a long bushing on that part of the screw shaft 24 back of the washer 31.

33 is a thrust washer sleeved on the bushing 32 back of the washer 31.

34 is a cap bolted to the lathe head and provided with a central orifice to accommodate the screw shaft 24 and bushing 32 and with a pocket fitting around the washers 33 and 31.

35 is a hand wheel on the rear end of the screw 24.

36 is a hand wheel threaded on screw 24 and arranged to press on the bushing 32 to draw collar 30 against washer 31, thus clamping screw 24 to spindle 15.

By turning the hand wheel 35, the nut 25 may be moved forwardly, which compresses the spring 28 against the flange 23 on the spindle 18, thereby pressing the spindle against the bushing 19 with sufficient force to hold the axle without shake. By turning the hand wheel 36, the bushing 32 is moved forwardly, binding the collar 30 against the disk 31 and locking or clamping the screw 24.

In order to force the drivers 21 into the wheel rims with sufficient power to make them drive, the head 11 is pushed toward the work by rotating the screw 12 as hereinbefore described. If the spindle 18 were fixed to the sleeve 15, the pressure upon the bushing might be too great, but by reason of the described construction, the pressure applied to the bushing is only that which is produced by the compression of the spring 28. The construction has the further advantage of maintaining a uniform pressure on the bushings, even if the heads were to spring apart slightly under the influence of the cut.

When using center 20 and bushing 37, illustrated in Fig. 3, the final operation of setting the work, after the drivers 21 have been pushed home, is to force the nut 25 forwardly until its shoulder 27 strikes the flange 23, so that the full force of the screw is brought to bear solidly upon the center 20, the spring, under these conditions, performing no function during the turning operation.

It is not essential that means shall be provided to lock the screw 24, as the spring 28 is effective to take up any lost motion that might be produced if the screw 24 were to back off slightly. It is preferred, however, to provide such a locking device, as it is of importance when using the bushing 37 and center 20.

Having now fully described my invention, what I claim and desire to protect by Letters Patent is:—

1. In a lathe, the combination with the lathe head, of a rotating part including the driver for the work, a centering spindle movable relatively to the rotating part in the direction of its axis of rotation, manually operated means adapted to advance said spindle, an elastic medium interposed between said spindle-advancing means and the spindle and adapted, during resistance of the spindle to forward movement, to be compressed to allow said spindle-advancing means to positively abut against said spindle.

2. In a lathe, the combination with the lathe head, of a rotating part including the driver for the work, a centering spindle movable relatively to the rotating part in the direction of its axis of rotation, manually operated means, adjustable relatively to the lathe in the direction of its axis, adapted to advance said spindle, an elastic medium interposed between said spindle-advancing means and the spindle, and adapted, during resistance of the spindle to forward movement, to be compressed to allow said spindle-advancing means to positively abut against said spindle, and a locking device adapted to hold said spindle-advancing means in its adjusted position.

3. In a lathe, the combination with the lathe head, of a rotating part thereon including the driver for the work, a centering spindle movable relatively to the rotating part in the direction of its axis, an elastic medium, and a screw shaft and a nut thereon one of which is held from longitudinal movement relatively to the lathe head and between the other of which and the spindle said elastic medium is confined.

4. In a lathe, the combination with the lathe head, of a rotating part thereon comprising a sleeve and the face plate, a centeing spindle within the sleeve and movable longitudinally relatively thereto, an elastic medium within the sleeve, and a screw shaft and a nut thereon, one of which is held from longitudinal movement relatively to the sleeve, and between the other of which and the spindle said elastic medium is confined.

5. In a lathe, the combination with the lathe head, of a rotating part thereon including the work-driver, a rotatable centering spindle movable relatively to said rotating part in the direction of its axis, a rotatable screw shaft held from longitudinal movement, a nut on said shaft, and an elastic medium, adapted to force said spindle forwardly, confined between the nut and the spindle.

6. In a lathe, the combination with the lathe head, of a rotating part thereon including the work-driver, a rotatable centering spindle movable relatively to said rotating part in the direction of its axis, a screw shaft, a nut thereon slidable within and rotatable with, said spindle, and an elastic medium, confined between the nut and the spindle, adapted to force said spindle forwardly.

7. In a lathe, the combination with the lathe head, of a rotating part thereon comprising a sleeve and the face-plate, a centering spindle within the sleeve and movable relatively to the rotating part in the direction of its axis, a screw-shaft, a nut thereon, flanges on the spindle limiting the relative movement of the nut, and an elastic medium confined between the nut and one of said flanges.

In testimony of which invention, I have hereunto set my hand, at Philadelphia, on this 7th day of June, 1909.

LARS H. VOLD.

Witnesses:
WARREN R. CHURCH,
HELEN FAHNESTOCK.